United States Patent [19]

Gantz et al.

[11] 4,162,117

[45] Jul. 24, 1979

[54] OPTICAL IMAGE MULTIPLYING DEVICE

[76] Inventors: Jeanne A. Gantz, 1972 El Dorado Ave., Berkeley, Calif. 94707; David W. Kelso, 3929 Everett Ave., Oakland, Calif. 94602

[21] Appl. No.: 838,150

[22] Filed: Sep. 30, 1977

[51] Int. Cl.² ............................................. G02B 27/08
[52] U.S. Cl. ...................................................... 350/4.2
[58] Field of Search .................................. 350/4.1, 4.2

[56] References Cited

U.S. PATENT DOCUMENTS

| 2,152,424 | 3/1939 | Wetmore | 350/4.2 X |
| 2,762,257 | 9/1956 | Vacher | 350/4.2 X |
| 3,039,356 | 6/1962 | Knittel | 350/4.2 |
| 3,122,859 | 3/1964 | Reaux, Jr. | 350/4.1 X |
| 3,343,453 | 9/1967 | Butterfield | 350/4.1 X |

Primary Examiner—Richard A. Wintercorn
Attorney, Agent, or Firm—Townsend and Townsend

[57] ABSTRACT

An optical device for multiplying pictorial images which includes a plurality of pictorial objects mounted for movement within a compartment positioned adjacent two plane mirrors placed at an angle so that changes of position of the objects may be viewed as an infinite symmetrically multiplied photomontage.

6 Claims, 16 Drawing Figures

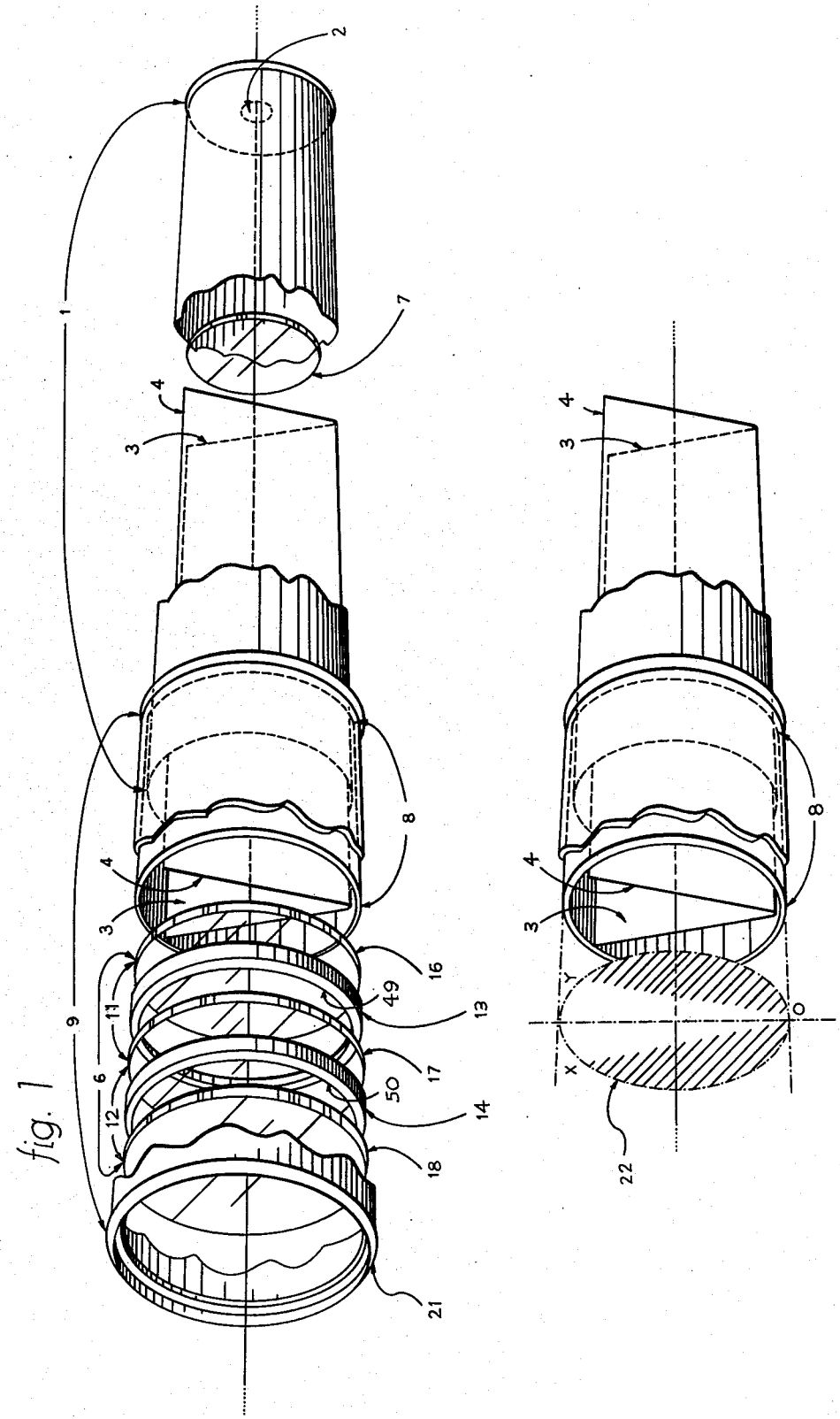

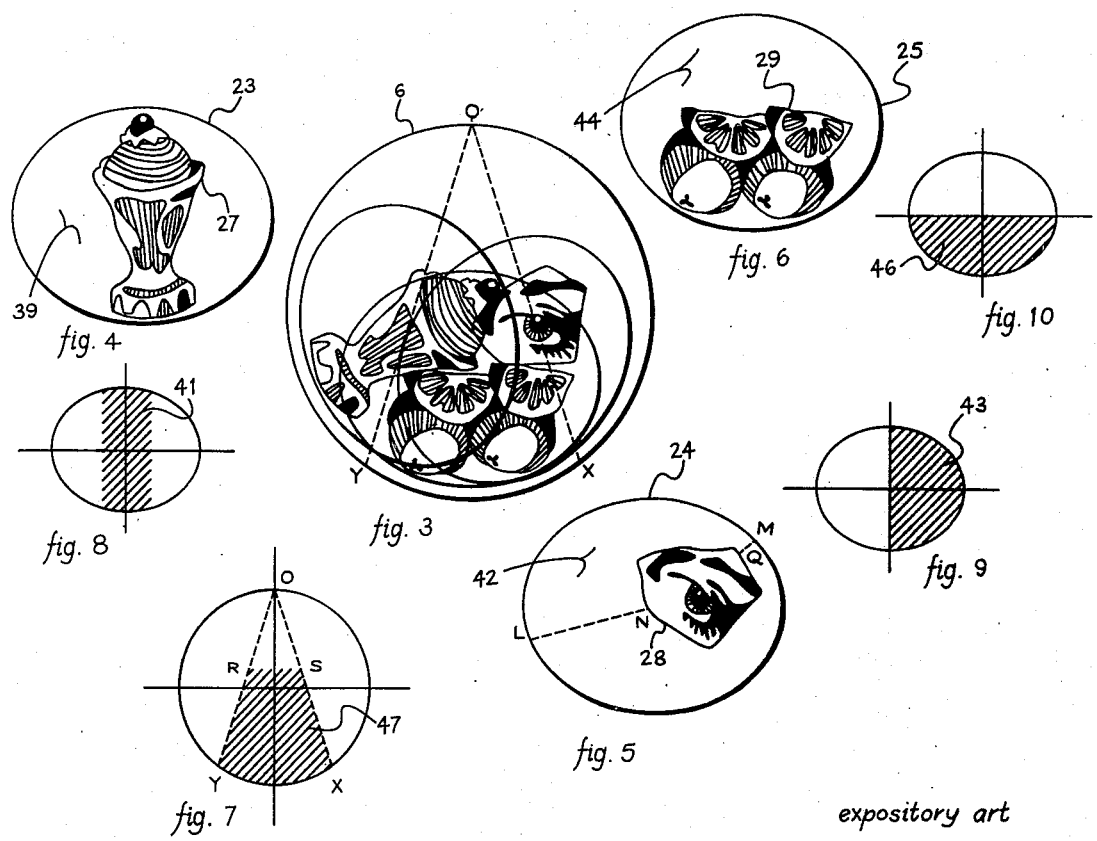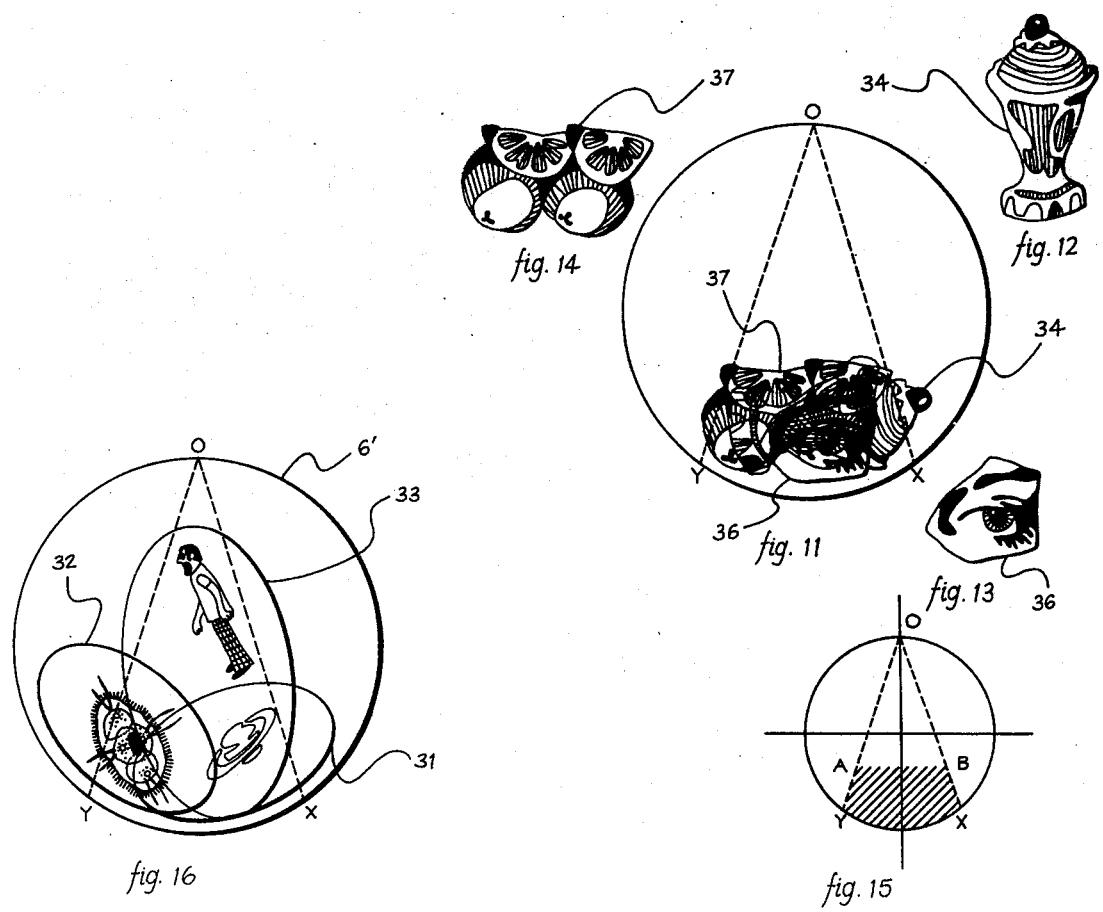

OPTICAL IMAGE MULTIPLYING DEVICE

BACKGROUND OF THE INVENTION

Pictorial image multiplication within an optical device has proven as illusive to inventors as the illusion they hoped to create.

Pictorial image multiplication has intrigued man since the invention of the mirror. What child hasn't stood for hours in front of an old fashioned hinged three mirror dresser and amused himself for hours multiplying his image. The first writings we can find on the subject occur in *Magia Naturalis,* book, VII, ch. 2, where Baptista Porta described the effect of two plane mirrors as a machine for multiplying images. An explanation of this phenomenon was explained as early as the year 1646 by Kircher in *Ars Magna Lucis et Umbrae,* p. 890. He explained the relation between the number of images and the inclination (angle of incidence) of the two mirrors. Propositions in Harris' *Optics* and Wood's *Optics* relate to the multiplication and circular arrangement of the apertures or sectors formed by the inclined mirrors, and to the progress of a ray of light reflected between two inclined or parallel mirrors.

Sir David Brewster in the year 1814 combined these teachings with his own research on light polarization by successive reflections between plates of glass and developed and subsequently patented in England an optical instrument the kaleidoscope. Brewster's kaleidoscope was capable of receiving into the direct viewing sector colors, abstract outlines, shapes, and patterns which were multiplied symmetrically but he was unable to overlay multiple pictorial images. In 1819, Brewster published his *Treatise on the Kaleidoscope* which documents his discoveries and refinements of the Instrument; among these, the telescopic and microscopic kaleidoscopes, the polyangular, parallel, and the polycentral kaleidoscopes. Brewster was able to optically reduce and focus images from the immediate environment onto the direct viewing sector but he was restricted to focusing on a single image, and multiplying that image. He was unable to overlay or place in juxtaposition two different pictorial images and multiply both of them.

Bickerton and O'Halloran, British Pat. No. 21,006 (1913) patented an improved kaleidoscope capable of mutliplying a single pictorial image beyond the end of the devie. This device, like Brewster's could not multiply a plurality of pictorial objects outside the device, nor could it multiply even a single pictorial object mounted within the object cell of the device.

Burnside, U.S. Pat. No. Re. 26,031, 1966, patented a kaleidoscope which could also view objects lying within the field of direct view of the user of the instrument such as clouds, houses, people and works of art, but again the objects were not contained within the instrument itself.

SUMMARY OF THE INVENTION

While others have sought to improve the kaleidoscope by multiplying geometric objects and light patterns by projecting the images on ground glass such as Pritchard, British Pat. No. 2290 (1873) or projecting such patterns on screens, such as Jordan, U.S. Pat. No. 3,030,856 (1962), we have devised an instrument which multiplies images of a plurality of pictorial objects mounted for movement within the instrument.

The gist of the present invention is the use of xerox color transparencies of pictorial objects instead of the bits of colored glass or celluoid which have been used ever since the Brewster kaleidoscope first developed in 1814.

An object of the present invention is to use any photographic transparencies as moving objects within the object cell of our pictorial image multiplying device which has been sold under the trademark Kaleidorama.

A further object is to provide a device as previously described in which image interference by object overlay is minimized.

A still further object is to provide a device as described which will allow freer rotation of the objects and emphasize certain objects over the others.

Still another object is to provide a device which is compatable with other devices and will permit pictorial images to be projected on either ground glass or a projection screen.

BRIEF DESCRIPTION OF THE DRAWINGS

FIG. 1 is an exploded perspective view of the device of the present invention with portions removed for purposes of clarity.

FIG. 2 is a duplication of a portion of the device illustrated in FIG. 1 with a schematic representation of the direct viewing area of the device.

FIG. 3 is an end view of the object cell of the device shown in FIGS. 1 and 2 showing one position which each of three different pictorial objects may take within the cell. The broken lines "OXY" schematically indicate the extent of the direct viewing sector of the object cell.

FIG. 4 is a plan view of one of the pictorial objects shown in FIG. 3. A selected pictorial illustration is illustrated on a transparent or translucent background or field.

FIG. 5 is a plan view of another pictorial object shown in FIG. 3. A selected pictorial illustration is illustrated on a transparent or translucent background or field.

FIG. 6 is a plan view of still another pictorial object shown in FIG. 3. A selected pictorial illustration is illustrated on a transparent or translucent background or field.

FIG. 7 is a schematic representation of the direct viewing area "OXY" shown in FIG. 3 with the shaded area graphically showing the direct viewing area covered by the position of the pictorial objects illustrated in FIG. 3.

FIG. 8 is a schematic representation of the pictorial object shown in FIG. 4 graphically representing the pictorial area by line shading and the clear field area.

FIG. 9 is a schematic representation of the pictorial object shown in FIG. 5 graphically representing the pictorial area by line shading and the clear field area.

FIG. 10 is a schematic representation of the pictorial object shown in FIG. 6 graphically representing the pictorial area by line shading and the clear field area.

FIGS. 11–15 represent an expository illustration of the invention shown in FIG. 3. It is not known whether anyone has publicly or privately used pictorial objects as illustrated. The purpose of these illustrations is to graphically illustrate the advantage of combining a clear field with a pictorial illustration on the plurality of objects.

FIG. 11 is an end view of the object cell of the device shown in FIGS. 1 and 2 but showing one position which each of three different pictorial objects having no clear field could take within the cell. The broken lines "OXY" schematically indicate the extent of the direct viewing sector of the object cell. Note that no clear visual image is obtained because of the interference of each pictorial object.

FIG. 12 is a view of one of the pictorial objects having no surrounding clear field as shown in FIG. 11.

FIG. 13 is a view of another pictorial object having no surrounding clear field which is shown in FIG. 11.

FIG. 14 is a view of still another pictorial object having no surrounding clear field which is shown in FIG. 11.

FIG. 15 is a schematic representation of the direct viewing area "OXY" shown in FIG. 3 with the shaded area graphically showing the direct viewing area covered by the position of the pictorial objects illustrated in FIG. 11.

FIG. 16 is an end view of the object cell of the device shown in FIG. 1 and 2 showing one position which each of three different pictorial objects may take within the cell. The broken lines "OXY" schematically indicate the extent of the direct viewing sector of the object cell.

DESCRIPTION OF THE INVENTION

The device of the present invention is constructed like a standard kaleidoscope, except that instead of forming the objects from pieces of colored glass or plastic, the objects carry a pictorial image. The visual result of the device is striking. Instead of seeing an array of different colors or patterns, in the present device, one sees actual color photographic images such as flowers, people, animals and scenery combined in endless variations.

Referring to FIG. 1, the device consists of an ocular body 1 having an ocular aperture 2 in one end, V-shaped reflecting planes 3 and 4 contained in the body and an object cell 6 mounted on the other end of the body. An ocular glass 7 may be placed adjacent the ocular aperture. The angle of inclination of the reflecting planes may be set at various angles, but an angle of 36 degrees gives good image multiplication. A sleeve 8 may be fitted outside the ocular body but inside the objective body 9. Preferably, the objective body is mounted to rotate freely in relation to the ocular body. One or more object compartments may be provided within the object cell, and as shown in FIG. 1, there are two separate compartments 11 and 12. The cell include housing rings 13 and 14 and objective transparent members such as glasses 16, 17 and 18. The glass 18 placed adjacent objective end 21 may be translucent and light diffusing.

Referring to FIG. 2, a portion of the device is repeated and portions are removed. The broken lines 22 represent a projection of the objective body on an imaginary plane. The direct viewing sector through the ocular aperture 2 on the imaginary plane is represented by the area between the points "OXY".

FIGS. 3 through 6 illustrate the key to the present invention. In FIG. 3, object cell 6 contains objects 23, 24 and 25. The uniqueness of these objects is the fact that they carry pictorial images 27, 28 and 29. With the advent of general photographic processes (e.g. photoreduction and enlargement, microscopic and telescopic photography) and color transparencies, the possibilities of photographic images are endless. By carefully selecting the photographic illustrations, creative and unusual visual results can be obtained by one image overlaying another image, each image moving independently of the others, and images from dissimilar or imaginative contexts can be juxtaposed.

For example, as shown in FIG. 16, the object cell 6' might contain a telescopically enlarged photo image of the planet Saturn 31; a microscopically enlarged image of a single-celled animal 32; and a reduced image of a human figure 33; all within the same direct viewing sector "OXY" with each of the images moving independently of the others. Because the images are transparencies, they are seen through and modify by interference all other images in front of or behind them within the direct viewing sector. "OXY". Also because the images are simple, of greatly differing size and may be of different colors, recognition of the individual pictorial images is possible.

If, on the other hand, the pictorial images are fairly complex as shown in FIGS. 11 through 14, interference of each pictorial image can result in non-recognition of any of the images and give an unsatisfactory visual result. FIG. 12 represents the familiar ice cream sunday 34 consisting of a glass filled with ice cream and a topping. The object 34 is coextensive with the picture. FIG. 13 is a picture of a portion of a human face 36 including an eye with the outline of the object 36 cut to an unrecognizable form. FIG. 14 illustrates an object 37 which is abstract and the outline is a non-recongizeable form.

If the objects of FIGS. 12-14 take the position as shown in FIG. 11, and assuming they are all within the direct viewing area "OXY", only a dark non-recognizeable mass will be viewed through the ocular aperture. Further, since only the shaded area 38 of area "OXY" as illustrated in FIG. 15 will be filled with objects, the area "OAB" will be viewed as a blank area which will either be a shade of light or a dark color depending on the background lighting.

One means of obtaining visual recognition of the pictorial images, even when they overlap as shown in FIG. 11 is to place the picture on the objects with information carrying areas and clear or translucent areas between each information carrying area. This may be done by producing transparencies which have voids between each information carrying area or the pictures may be printed by a half tone process using a half tone screen. Thus some of the areas between the dots using the half tone process are clear.

The preferred way, however, of obtaining the greatest recognizability is to place a color Xerox reproduction on clear acetate for the pictorial object. A characteristic of the Xerox process is the fact that the color transparencies are similar to a half tone screen process.

Still another means for obtaining image recongizability is the placement and separation of pictorial images within the object cell. Referring to FIGS. 3–10, the pictures shown may be printed pictures, photographic transparencies or Xerox color transparencies. Preferably all are printed by a half tone screen or a process creating a similar effect.

In FIG. 4, a picture of an ice cream Sunday 27 including a glass filled with ice cream and a topping is reproduced on a glass or plastic object 23 having a clear background field 39. The image is placed in the approximate center of the object member and covers the shaded area 41 shown in FIG. 8. The object member is eliptical although it could have any other shape. FIG. 5 is a picture of a portion of a human face 28 including an eye and is placed off center on an object 24 having a clear background 42. The shaded area 43 in FIG. 9 roughly approximates the area covered by the pictorial image in FIG. 5. FIG. 6 is a picture of several abstract objects 29 and the image is placed near one edge of an object 25 having a clear background 44. The shaded area 46 in FIG. 10 represents the approximate area covered by the pictorial image in FIG. 6.

FIG. 3 illustrates one of an infinite variety of positions the objects 23, 24 and 25 might take. Note that each of the three objects is clearly discernable and there is very little overlapping of the pictorial images. Note further that the pictorial images fill a greater portion of the direct image area. The portion of the direct image area filled is illustrated by the shaded area 47 shown in FIG. 7 and bounded by the points R, S, Y and X. Compare e.g., the shaded area in FIG. 7 with the shaded area of FIG. 15 where the pictorial images are not surrounded by clear fields.

As stated above, because the effect of including photographic or color xerography images in image multiplying devices relies heavily upon the recognizability of the individual pictorial images, it is imperative that these images be placed in such a way as to insure a certain frequency of image separation to offset the obscuring of one image by interference with another or others. This separation is accomplished, not only by isolating the individual image upon a field of clear film or acetate, but also carefully placing the images on different parts of the clear background. Note the different placement of the images in FIGS. 4, 5 and 6. Thus the periphery of the clear field, rather than the periphery of the image itself, contacts the circumference of the object cell. When the objective body is rotated, the image is fixed within the clear field whose periphery rotates along the circumference of the object cell, and the distance between the circumference of the object cell and the image periphery will vary with the distance between the image periphery and the field periphery at any given point. For example, in FIG. 5, the distance between the image periphery and the field periphery is greater between point L on the field periphery and point N on the image periphery than is the distance between point M on the field periphery and point Q on the image periphery. Thus if object 24 rests upon the circumference of the object cell at point L on the field periphery, the image will be at a greater distance from the circumference of the object cell than if object 24 rested at point M. These variations in distance between the circumference of the object cell and the image periphery cause each image to shift continually in its spatial relationship to other images in the object cell as well as to the circumference of the object cell and the shifting spatial relationships among the images increase the frequency at which the individual images are spatially separated enough from one another to be recognizable. Total separation of the images from one another cannot be achieved unless the images are permanently affixed to the object cell. By placing the images each within a clear field, however, the total interference of images illustrated in FIG. 11 is avoided and the frequency of image separation is greatly increased.

In order to obtain freer tumbling of the image objects and controlled positioning of the image, the object cell may consist of a plurality of spaced compartments 11 and 12 as shown in FIG. 1. Each of the object cells may carry at least one selected pictorial object. To emphasize one image over another, the primary image may be placed in the compartment nearest the reflecting planes and closest to the viewing aperture.

Image illumination is essential in any image multiplying device. The clarity of image in the color transparencies depends on each image being illuminated by white or unmodified light. The white light that enters through the ground glass into the multiple cells is scattered or reflected by the white wall 49 and 50 that hold the glass discs 16, 17 and 18. The scattered unmodified light can then illuminate the individual image since the separation of images into two or more discreet compartments allows the light to bypass the image in the first cell 12. Without modification and illuminate the image in the second cell 11. This allows the primary image in cell 11 to retain maximum clarity. On the other hand, in a single compartment device, the continuous gradient transparencies are of necessity in contact with each other and cause the subtraction of color. Thus, if red overlaps green, essentially no light is transmitted. If, however, the image bearing material is in the form of a half tone, unmodified light can reach multiple compartment devices, but also light will reach the inner compartments directly through the clear areas between the image bearing dots. Due to the lack of obstruction in half tone images, the objects may occupy one compartment thus achieving the illumination benefits of the multicompartment approach without the structural complexity of such a device.

We claim:

1. In an optical image multiplying device having an ocular body, an ocular aperture in one end, reflecting planes contained in said ocular body, and an object cell mounted on the other end of said body, the improvement comprising:

first and second tumbler objects within said object cell, each object carrying a pictorial representation on a first region thereof, said pictorial representation on said first region of said first object including a light transmitting portion through which details of said pictorial representation of said second object can be seen when viewed through said light transmitting portion.

2. The invention of claim 1 wherein said first object includes a second light transmitting region extending to an edge of said first object.

3. The invention of claim 2 wherein said first regions of said first and second objects are on geometrically different selected regions of said objects such that said first and second pictorial representations intermittently overlap and separate as said objects freely rotate and tumble in said object cell, said separation being sufficient to render at least one of said pictorial representations generally recognizable at said position of separation.

4. The invention of claim 1 wherein said object cell comprises first and second individual compartments, containing said first and second tumbler objects, respectively, such that said tumbler objects in said compartments may tumble and rotate independently of one another.

5. The invention of claim 4 wherein said first compartment is located between said second compartment and said reflecting planes, and wherein said object cell includes means for illuminating said first object in said first compartment with light that is substantially unmodified by said second object in said second compartment.

6. The invention of claim 5 wherein said means for illuminating comprises a white wall surrounding said object cell wherein light entering said object cell is scattered from said white wall in order to illuminate said first object.

* * * * *